United States Patent [19]

Stetson, Jr.

[11] Patent Number: 5,308,024
[45] Date of Patent: May 3, 1994

[54] DISTURBANCE TORQUE COMPENSATED THREE AXIS YAW CONTROL SYSTEM

[75] Inventor: John B. Stetson, Jr., New Hope, Pa.

[73] Assignee: General Electric Co., East Windsor, N.J.

[21] Appl. No.: 916,734

[22] Filed: Jul. 20, 1992

[51] Int. Cl.⁵ .................................................. B64G 1/28
[52] U.S. Cl. .......................................... 244/165; 244/171; 364/434
[58] Field of Search ...................... 244/164, 165, 171; 364/434, 459

[56] References Cited

U.S. PATENT DOCUMENTS

| | | | |
|---|---|---|---|
| 4,521,855 | 6/1985 | Lehner et al. | 364/434 |
| 5,205,518 | 4/1993 | Stetson, Jr. | 244/165 |
| 5,211,360 | 5/1993 | Zimbelman | 244/164 |

Primary Examiner—David A. Bucci
Assistant Examiner—Anne E. Bidwell
Attorney, Agent, or Firm—W. H. Meise; C. A. Berard; S. A. Young

[57] ABSTRACT

A satellite attitude control system is usable in the absence of any inertial yaw attitude reference, such as a gyroscope, and in the absence of a pitch bias momentum. Both the roll-yaw rigid body dynamics and the roll-yaw orbit kinematics are modelled. Pitch and roll attitude control are conventional. The model receives inputs from a roll sensor, and roll and yaw torques from reaction wheel monitors. The model produces estimated yaw which controls the spacecraft yaw attitude. The model further produces estimates of the constant component of the disturbance torques for compensation thereof.

9 Claims, 6 Drawing Sheets

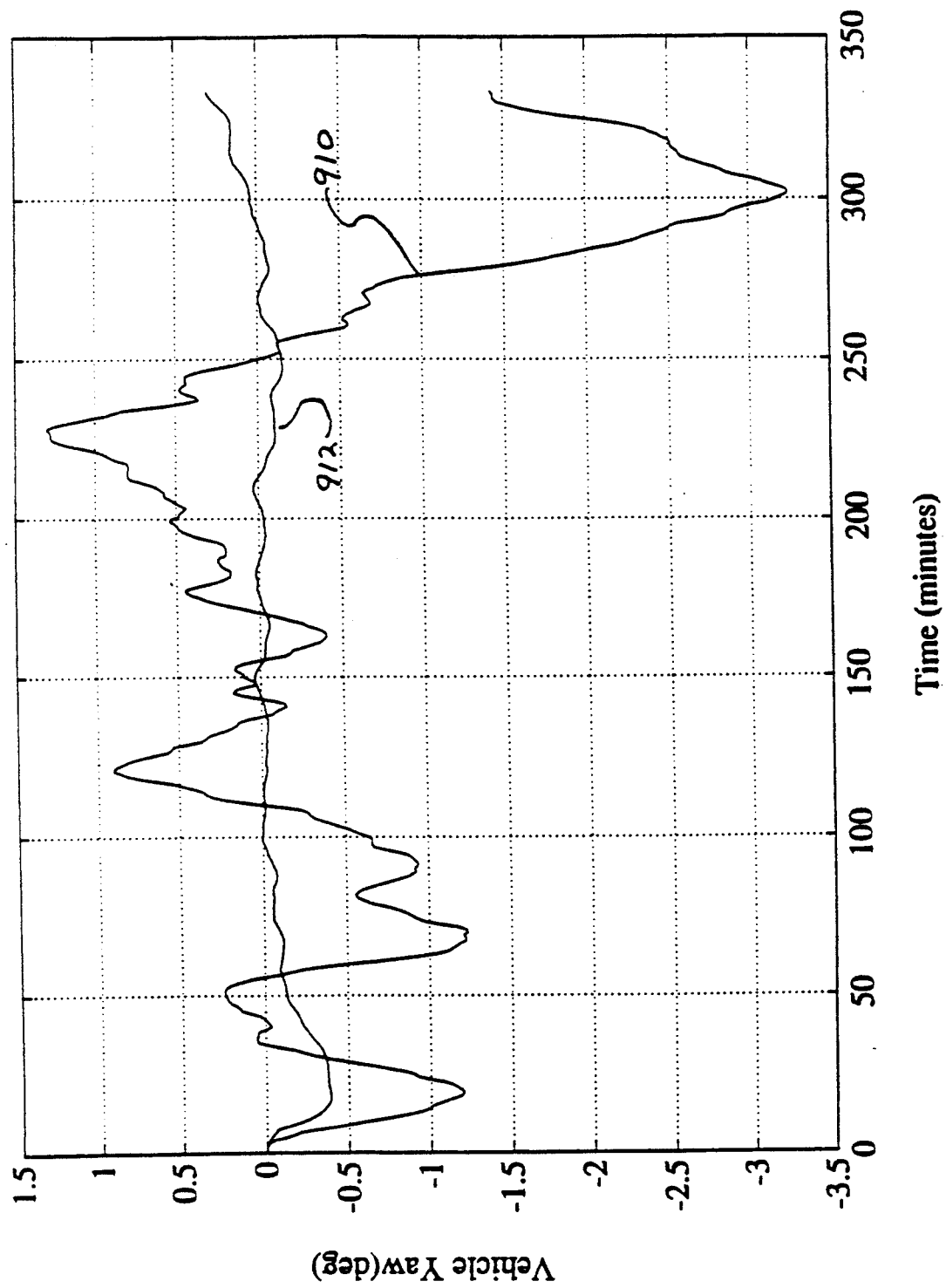
FIGURE 9 - Yaw Pointing Performance

DISTURBANCE TORQUE COMPENSATED THREE AXIS YAW CONTROL SYSTEM

BACKGROUND OF THE INVENTION

This invention relates to attitude control systems generally, and more particulary to disturbance torque compensation for attitude control systems for stabilizing 3-axis zero-momentum satellites in the absence of attitude reference information from yaw and/or roll inertail references such as gyroscopes.

Modern satellites are widely used for communications and Earth sensing applications. All such satellite applications require control of the satellite's orientation in space so that sensors and antennas may be pointed in appropriate directions. Satellites orbiting the Earth, or other heavenly body (hereinafter Earth), do not maintain a single face directed toward that body without additional control. This control is normally termed attitude control. One type of attitude control includes the use of one or more momentum wheels, which stabilize attitude by providing momentum bias or gyroscopic stiffness. A momentum bias can only indirectly stabilize satellite axes lying in a plane orthogonal to the bias axis, but direct control is not provided. To satisfy the more stringent orientation requirements associated with modern satellite missions, direct control of the satellite axes of rotation is required. Three axes are commonly used: the yaw axis is oriented toward the Earth, the pitch axis is aligned with the satellite's orbit normal, and the roll axis completes the right-handed orthogonal axis set. Those skilled in the art know that other non-orthogonal sets can be used, and that simple transformations relate such sets to the orthogonal set.

The manufacture and launch of satellites is very capital intensive. Consequently, to keep the unit cost of satellite services low, the satellite must be operated for a long time. For this reason, satellite reliability is a major concern requiring such strong measures as redundancy, qualification and pre-launch test.

Typical three axis stabilized satellite attitude control is accomplished by directly sensing the three orthogonal attitudes: Yaw(x), Roll(y), and Pitch(z), and commanding corrective control torques through reaction wheel actuators, or other torque generators. Such control often uses a Earth Sensor Assembly (ESA) to provide roll and pitch attitude information. A gyroscope is used to provide the inertial yaw axis attitude information, because yaw errors (the yaw degree of freedom) are not observable with the ESA. Pitch and roll gyros are often used in ascent and Earth acquisition phases of the satellite's launch. Once the Earth has been acquired, however, the roll and pitch attitude information is derived from the ESA rather than from the gyros.

The ESA assembly can be fabricated without moving parts, and consequently may be very reliable. Even so, redundancy assures availability roll and pitch attitude information throughout the satellite's lifespan. However the yaw gyro is a mechanical device that is prone to failure. Direct redundancy is not normally used because of the gyro's high cost. One additional skew gyro provides the only redundancy for the three orthogonal gyros.

If the yaw gyro fails, redundant skew gyro could be used to provide yaw attitude information, but information derived solely from the skew gyro is contaminated with pitch and roll information. In order to derive yaw attitude information, from the skew gyro, the roll and pitch gyros are enabled to provide corrective signals. If, however, one of the roll or pitch gyros (or both) should also fail, no useful yaw information is available and the satellite attitude becomes uncontrolled. In addition, the satellite pointing error is worsened by environmental disturbance torques.

In low cost satellites in which precision pointing is not required, the cost of the ESA and gyros may be excessive, and other inertial references may not be available. An improved attitude control system is desired.

SUMMARY OF THE INVENTION

An attitude control system according to the invention controls the orientation of a zero momentum satellite relative to a heavenly body. The satellite has gyroscopic freedom in the orbital plane, and derives orientation references in the absence of operative scopes. First and second reaction wheels have a component of momentum along the satellite roll and yaw axes, respectively. An Earth sensor assembly is mounted on the satellite for generating signals representing roll attitude. First and second reaction wheel drivers coupled to the first and second reaction wheels, respectively, accelerate the wheels under the control of torque command signals representing torque commands about the satellite yaw and roll axes. First and second tachometer coupled to the first and second reaction wheels, respectively, generate speed signals representing their angular velocities. A roll attitude controller is coupled to the Earth sensor, and to at least one of the first and second reaction wheel drivers for accelerating at least an associated one of the reaction wheels for at least proportional and rate compensation of the roll attitude. A roll reaction wheel torque translator is coupled to at least one of the first and second tachometers for differentiating the speed signals to generate roll reaction wheel torque representative signals. A yaw reaction wheel torque translator is coupled to at least one of the first and second tachometers for differentiating the speed signals to generate yaw reaction wheel torque representitive signals. A yaw estimator is coupled to the Earth sensor, to the roll and yaw reaction wheel torque translator and to at least one of the first an action wheel drivers, for modeling the linearized roll/yaw orbit kinematics of the satellite, and for additionally modeling the roll/yaw rigid body dynamics of the satellite, and or applying signals representing roll attitude, and yaw and roll reaction wheel torque representative signals to the model, for generating and applying signals representing torque commands about the satellite yaw axis, to at least one of the first or second reaction wheel drivers. The constant component of at least one of the yaw and roll axis environmental disturbance torques is derived by averaging the wheel speed of the corresponding reaction wheel. When the wheels are skewed relative to the satellite body axes, the speed components along the body axes are averaged.

BRIEF DESCRIPTION OF THE DRAWINGS

FIG. 9 is a plot of the simulated yaw performance of the system of FIG. 8 with the performance of FIG. 6 for reference.

DESCRIPTION OF THE INVENTION

Figure 1:
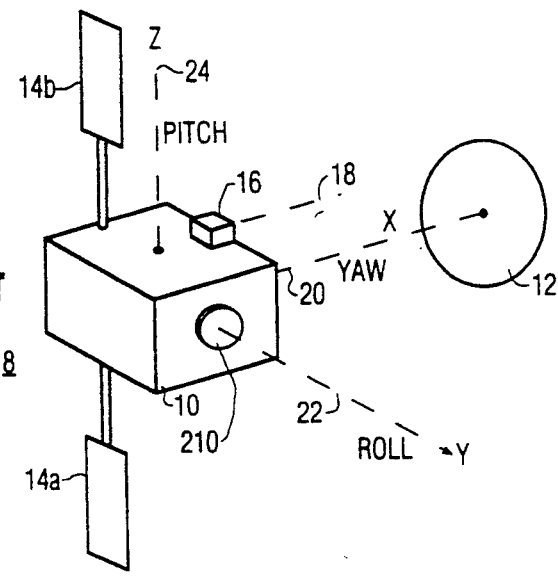
FIG. 1 is simplified overall view of an orbiting satellite.

In FIG. 1, a satellite 8 includes a body 10. Satellite 8 orbits about the Earth or another heavenly body 12. Body 10 supports first and second solar panels 14a and 14b. Body 10 supports an Earth sensor 16 which is capable of sensing the horizon, thereby providing pitch and roll attitude signals. Earth sensor 16 is oriented along an axis 18 which is parallel to body yaw axis 20. Body roll and pitch axes 22 and 24, respectively, are mutually orthogonal and orthogonal to yaw axis 20. The orbital direct-i-on of motion of satellite 8 is along body roll axis 22, and pitch axis 24 is orthogonal to the orbital plane.

Figure 2:
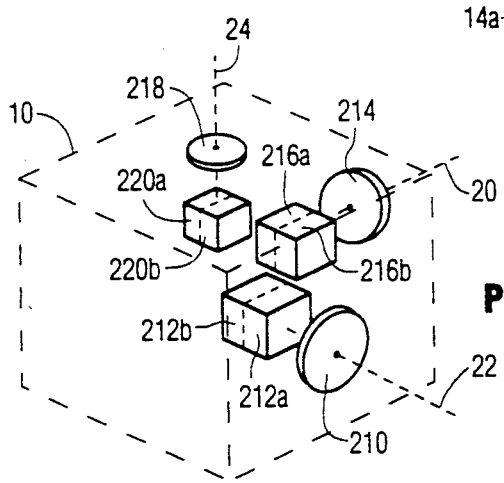
FIG. 2 is a simplified phantom view of a portion of the satellite shown in FIG. 1.

In FIG. 2 a Pitch reaction wheel 218 has its momentum axis parallel to (in this case coincident with) pitch axis 24. A pitch wheel driving assembly illustrated as a block 220a controls wheel 218 in a conventional manner.

Also in FIG. 2, a yaw reaction wheel 214 with its momentum axis parallel to (in this case coincident with) yaw axis 20, is driven by a driving assembly or motor 216a. The speed of the yaw wheel 214, is monitored by a tachometer 216b. A roll reaction wheel 210 with its momentum axis parallel to (in this case coincident with) roll axis 22, is driven by a driving assembly or motor 212a. The speed of the yaw wheel 210, is monitored by a tachometer 212b.

In general, the gyroless yaw control is provided by a model of the satellite roll-yaw rigid body dynamics, as in the prior art, together with a further model of the small angle roll-yaw orbit kinematics. The body dynamics are the rotational accelerations of the satellite body about its own center of mass in response to externally applied torques, which torques may be generated by an internal apparatus such as a reaction wheel. Small angle orbit kinematics describe the satellite's orbital motion. While it would be desirable to use general orbit kinematics in the model, the complexity of the non-linear calculations is not justified in view of the relatively small accuracy increment.

Figure 3:
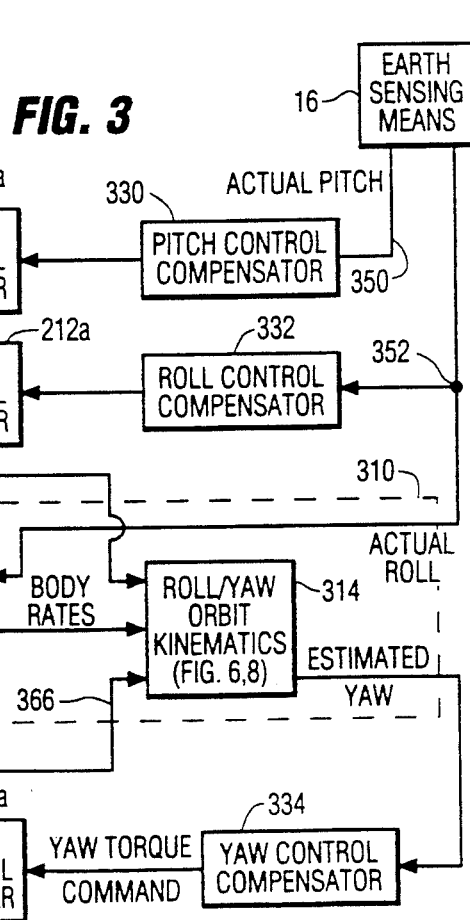
FIG. 3 is a simplified block diagram of a satellite attitude control system.

FIG. 3 is a simplified block diagram of a zero-momentum 3 axis stabilized satellite attitude control system using rigid body dynamic and orbit kinematic models in accordance with the invention. Elements of FIG. 3 corresponding to those of FIGS. 1 and 2 are designated by the same reference numerals. In FIG. 3 Earth sensor 16, produces measured or actual pitch and roll signals on data paths 350 and 352 respectively for application to pitch and roll control compensators 330 and 332 respectively. Details of pitch control compensator 330 are described in conjunction with FIG. 4 and those of roll control compensator 332 re described in conjunction with FIG. 5. Pitch and roll compensators 330 and 332 produce pitch and roll torque commands respectively, which are applied to pitch and roll wheel drivers 220a and 212a, respectively. Pitch and roll wheel drivers 220a and 212a drive pitch and roll reaction wheels 218 and 220, respectively. The angular speeds of pitch and roll reaction wheels 218 and 220 are measured by pitch and roll tachometers 220b and 212b, respectively.

A system model 310, in FIG. 3 includes a model, illustrated as a block 312, of the roll-yaw rigid body dynamics of the particular satellite. Such a model includes information relating to at least the inertia about the roll and yaw body axes. System model 310 also includes a model of the small angle roll-yaw kinematics, illustrated as a block 314. This information is not specific to any characteristic, such as mass or inertia, of the satellite itself Rather, only the satellite orbit rate $\omega_O$ is significant. Inputs to system model 310 include the actual roll derived from Earth sensor 16, and applied over data path 352, and roll and yaw torques, which are derived from roll tachometer 212b and from a yaw tachometer 216b, by way of roll and yaw translators illustrated as blocks 316 and 318 respectively. This minimal information allows the yaw to be estimated. The estimated yaw signal produced by system model 310 is applied to a yaw control compensator 334, similar to pitch and roll compensators 330 and 332, respectively, to produce Yaw torque commands which are applied to a yaw reaction wheel 210, by way of a yaw wheel driver, 216a. Thus, the yaw attitude may be corrected without any direct measurement thereof.

Prior art arrangements also include yaw estimators, as described for example in U.S. Pat. No. 4,521,855, issued Jun. 4, 1985 in the name of Lehner, et. al. While Such systems estimate yaw, their models couple the roll and Yaw dynamics by the pitch bias momentum. Thus, they can only be used for satellites including a pitch momentum wheel providing momentum bias. Under many conditions the pitch bias momentum results in coupling between the roll and yaw attitude motion. Such coupled motions complicate the control, and may limit achievable yaw and roll attitudes. For example, to change the yaw orientation in a pitch bias momentum satellite, application of a yaw torque results in the need to apply a compensating roll torque due to the gyroscopic coupling. Ordinarily, this undesirably results in expenditure of additional fuel.

As so far described in FIG. 3, the yaw is estimated without knowledge of the environmental disturbance torques. It has been discovered that unless the effects of the environmental disturbance torques are taken into account, the Yaw pointing accuracy may not be as accurate as is desired. In FIG. 3 an averaging circuit, illustrated as a block 360, is connected to a roll tachometer, 212b for averaging wheel speed signals, preferably over a long period of time such as one or more satellite orbits. The roll wheel speed average signal is applied over a path 362 to roll/yaw orbit kinematic model 314. A similar yaw wheel speed averaging arrangement 364, is coupled to yaw tachometer 216b for generating, a yaw wheel speed average signal which is applied by path 366 to roll/jaw orbit kinematics model 314.

Figure 4:
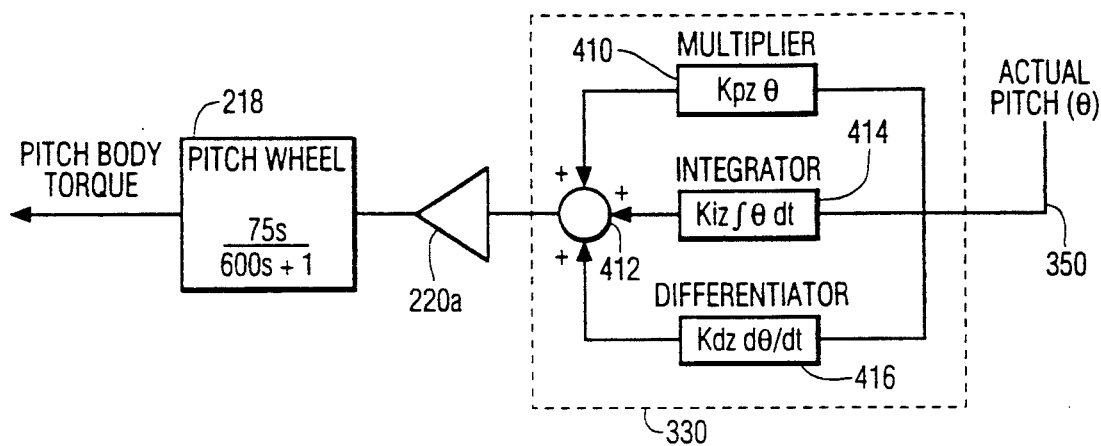
FIGS. 4 and 5 are simplified block diagrams of portions of the system of FIG. 3.

In FIG. 4, the measured or actual pitch ($\theta$), is applied from Earth sensor 16 (FIG. 3) over data path 350, in parallel, to a scalar multiplier 410 for multiplication by a factor Kpz to an integrator 414, for integration and multiplication by a factor Kiz, and to a differentiator, 416, for differentiation and multiplication by a factor Kdz. The resulting proportional, integral, derivative (PID) signals are summed in a summing circuit 412. While PID control is preferred, PD control has been found to be satisfactory for many control applications in which steady state sensor errors are not important. The pitch PID signal at the output of summer 412 is amplified, and if needed, analog-to digital-converted, in an amplifier, 220a. The amplified signal is applied to pitch wheel 218. In a particular embodiment of the invention, further described below, the pitch wheel dynamics are described in the Laplace domain by the transfer function: 75s/(600s+1), meaning that the amplified signal voltage results in a proportional pitch body torque for amplified signal frequencies greater than 1/600 sec.

Figure 5:
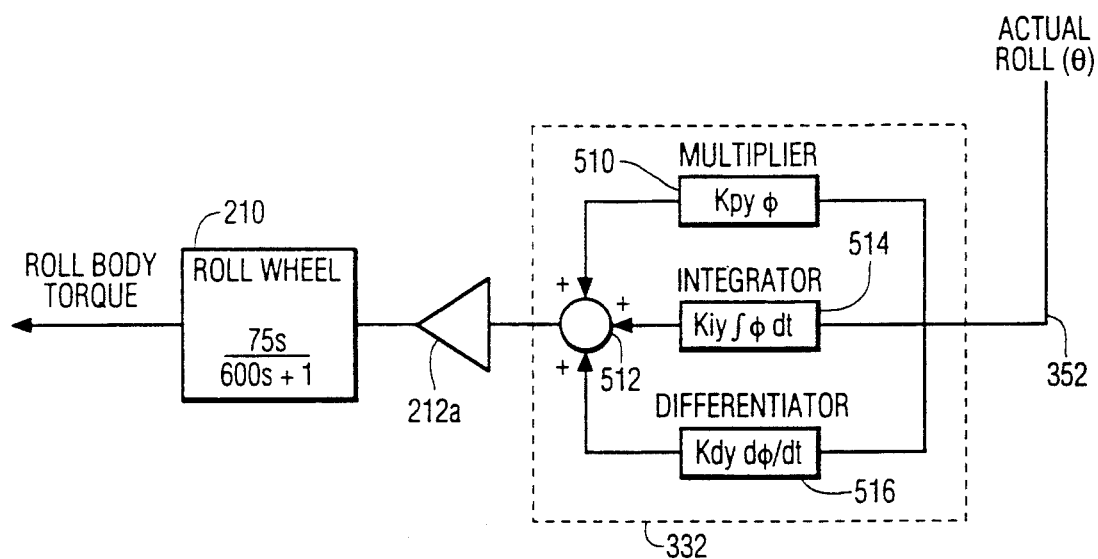

In FIG. 5, the measured or actual roll ($\phi$), is applied from Earth sensor 16 (FIG. 3) over data path 352, in parallel, to a scalar multiplier 510 for multiplication by a factor Kpy, to an integrator 514, for integration and multiplication by a factor Kiy, and to a differentiator, 516, for differentiation and multiplication by a factor Kdy. The resulting proportional, integral, derivative (PID)-signals are summed in a summing circuit 512. The roll PID signal at the output of summer 412 is amplified, in an amplifier, 212a. The amplified signal is applied to roll wheel 210. In the abovementioned embodiment of the invention, the roll and pitch reaction wheel dynamics are identical.

Figure 6:
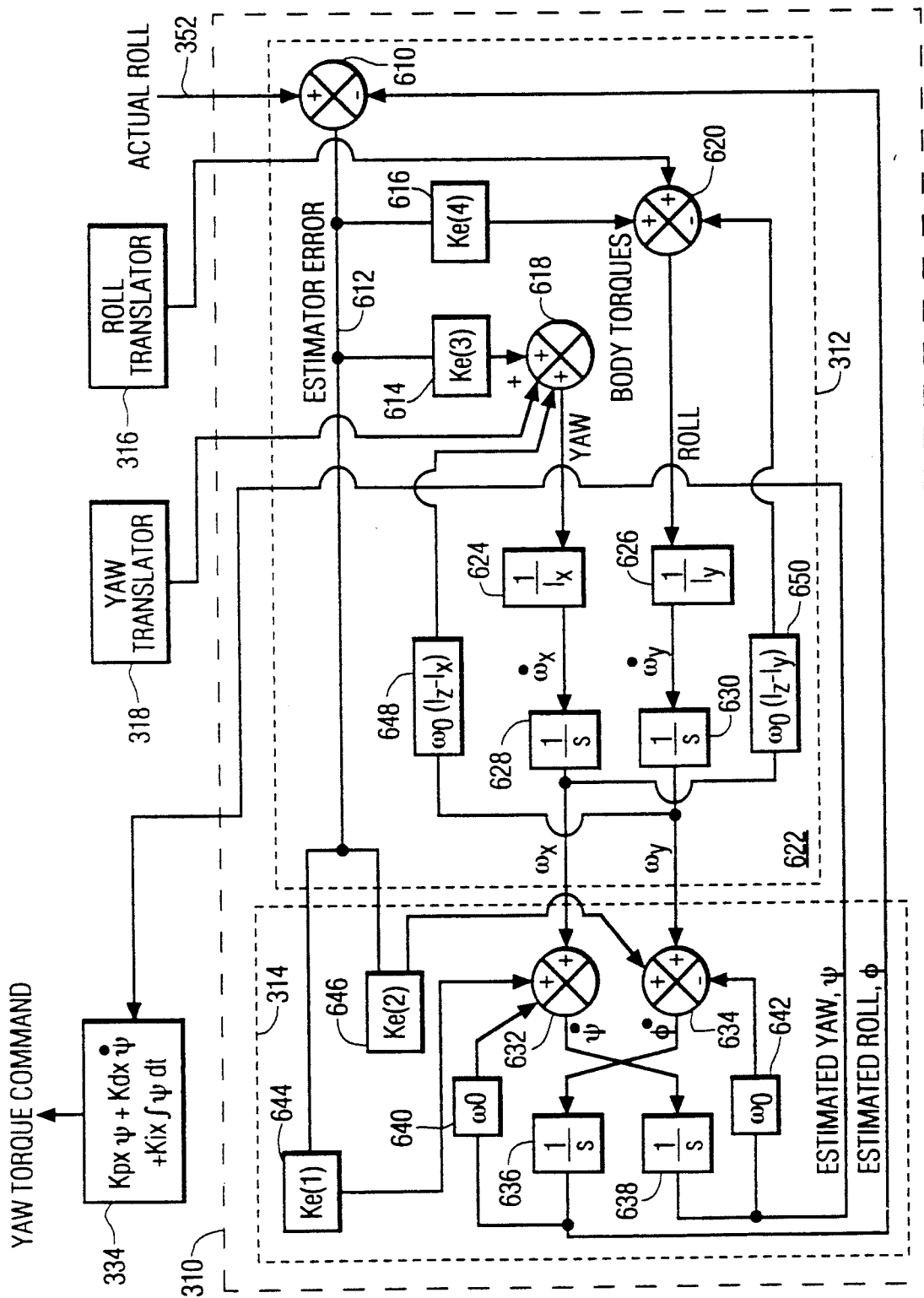
FIG. 6 is a simplified block diagram of roll and yaw rigid body dynamics and orbit kinematics models.

In the more detailed block diagram of FIG. 6, the actual roll signal ($\phi$) from Earth sensor 16 of FIG. 3 is applied over data path 352, to a non-inverting (+) input port of a summer, 610. Summer 610 also receives an estimated roll signal derived as described below, at its inverting (−) input port. The output of summer is the system error, termed "estimator" error. The estimator error is applied over a data path 612 to scalar multipliers 614, 616, 644, and 646, for multiplication by selected constants. The estimator error scaled by multiplier 614 is applied to a + input port of, a summer 618 together with actual yaw torques as translated from the yaw reaction wheel of FIG. 3 by yaw translator 318, and the roll gyroscopic torque produced by the scalar multiplier 648. Similarly, the estimator error scaled by multiplier 616 is applied to a + input port of a summer 620 together with actual roll torques as translated from the roll reaction wheel of FIG. 3 by roll translator 316. The yaw gyroscopic torque produced by the scalar multiplier 650 is applied to a (−) input port of 620. The output signals from summers 618 and 620 are the total yaw and total roll body torques, respectively.

The rigid body dynamics of the satellite, designated generally as 312 in FIG. 6, and more specifically designated 622, are represented by blocks 624, 626, 628, 630, 648 and 656. The total roll body torque, produced at the output of summer 620 is applied to a scalar multiplier 626 for dividing the total roll body torque by the known satellite roll axis rotary inertia, ($I_y$) to produce roll acceleration, $\omega_y$. Similarly, the total yaw body torque produced at the output of summer 618 is applied to a scalar multiplier 624, for dividing the total yaw body torque by the known satellite yaw axis rotary inertia, ($I_x$) to produce yaw acceleration, $\omega_x$. The yaw and roll body accelerations produced at the outputs of multipliers 624 and 626, respectively, are applied to time integruators 628 and 630, respectively, to produce yaw and roll body angular velocities $\omega_x$, and $\omega_y$ respectively. The output of the roll-yaw rigid body dynamics 312 are the estimated roll and yaw body angular velocities $\omega_x$ and $\omega_y$ respectively. The yaw body angular rate produced at the output of integrator 628 is applied to a scalar multiplier 650 for multiplying the yaw body angular rate by the product of the satellite orbital rate ($\omega_o$) and the difference between the known satellite pitch rotary inertia ($I_z$) and roll inertia ($I_y$) to produce gyroscopic roll torque. The roll body angular rate produced at the output of integrator 630 is applied to a scalar multiplier 648 for multiplying the total roll body angular rate by the product of the satellite orbital rate ($\omega_o$) and the difference between the known satellite pitch rotary inertia ($I_z$) and yaw inertia ($I_x$) to produce gyroscopic yaw torque. Block 648 represents the coupling of rotation about the roll axis into yaw torque attributable to the orbital rotation of the satellite about the Earth. Block 650 similarly represents the coupling of rotation about the yaw axis into roll torque attributable to the orbital rotation of the satellite about the Earth.

The roll-yaw orbit kinematics estimator 314 in FIG. 6 includes a yaw summing circuit 632, which receives the estimated yaw body angular velocity $\omega_x$, at a + input port, together with estimator error scaled by multiplier 644. Similarly, estimator 314 of FIG. 6 includes a roll summing circuit 634 which receives the estimated roll body angular velocity $\omega_y$, at a + input port, together with estimator error scaled by multiplier 646. Summer 632 produces the estimated yaw attitude rate $\psi$, which differs from the body yaw rate, $\omega_x$ in that the yaw attitude rate includes the effect of yaw-roll orbital coupling. Similarly, summer 634 produces the estimated roll attitude rate $\psi$, which differs from the body roll rate, $\omega_y$ in that the roll attitude rate includes the effect of yaw-roll orbital coupling.

The outputs of summers 632 and 634 are applied to time integrators 638 and 636 respectively to integrate the estimated yaw and roll attitude rates respectively, to produce estimated yaw and roll attitudes, $\psi$ and $\phi$ respectively.

The estimated roll at the output of time integrator 636 is fed back to a + input of summer 632 by way of a scalar multiplier 640 which multiplies by a factor $\omega_0$, representative of the satellite's orbital angular velocity. The estimated roll produced at the output of integrator 636 is applied to an inverting input of summer 610. Similarly, the estimated yaw at the output of time integrator 638 is multiplied by $\omega_0$ in a scalar multiplier 642 and applied to an inverting (−) input of summer 634. The estimated yaw produced at the output of integrator 638 is the desired output of system model 310.

The estimated yaw output from system model 310 is applied to yaw control compensator 334 of FIG. 3, which is identical to the pitch or roll compensators 330 or 332 respectively.

In order to understand the concepts underlying the invention, one may consider that the estimator is used to control the yaw attitude. The essence of the estimator can be described by a simplified, four degree of freedom mathematical model of the roll/yaw orbit kinematics, and the roll/yaw rigid body dynamics of an orbiting vehicle. The degrees of freedom can be written as a state vector, X, as follows:

$$X = [\text{Yaw } (\psi), \text{Roll } (\Phi), \text{Yaw Rate}(\omega_x) \text{ Roll Rate } (\omega_y)]$$

The differential equations for the four states are:

$$\dot\psi = \omega_x + \omega_o \phi \qquad (1)$$
$$\dot\phi = \omega_y - \omega_o \psi$$
$$\dot\omega_x = I_x^{-1}[T_x + (I_z - I_y)\omega_o \omega_y]$$

-continued $$\dot{\omega}_y = I_y^{-1}[T_x - (I_z - I_x)\omega_o\omega_x]$$

Where $I_{xx}$, $I_{yy}$ and $I_{zz}$ are the vehicle yaw, roll and pitch rotary inertias about its center of mass, $T_x$, and $T_y$ are the total yaw and roll torques, and $\omega_O$ is the orbital angular velocity.

Since the state equations are cross-coupled, it is mathematically possible to reconstruct the estimated yaw attitude, $\psi$, and body rate, $\omega_x$, by knowing only the actual satellite roll attitude, $\Phi$. This permits using the four degree of freedom model as an estimator of the actual satellite yaw, roll, yaw rate and roll rate states, or degrees of freedom. The estimator forms the difference between the actual satellite roll (sensed by its Earth sensor or by other means) and the estimated roll to produce the estimator error. Then it drives the model with the estimator error to converge its state toward the actual satellite state. The convergence is accomplished by adding the estimator error, scaled by estimator gains (Ke(1) through Ke(4) to each of the four differential equations of motion for the four states.

Figure 7:
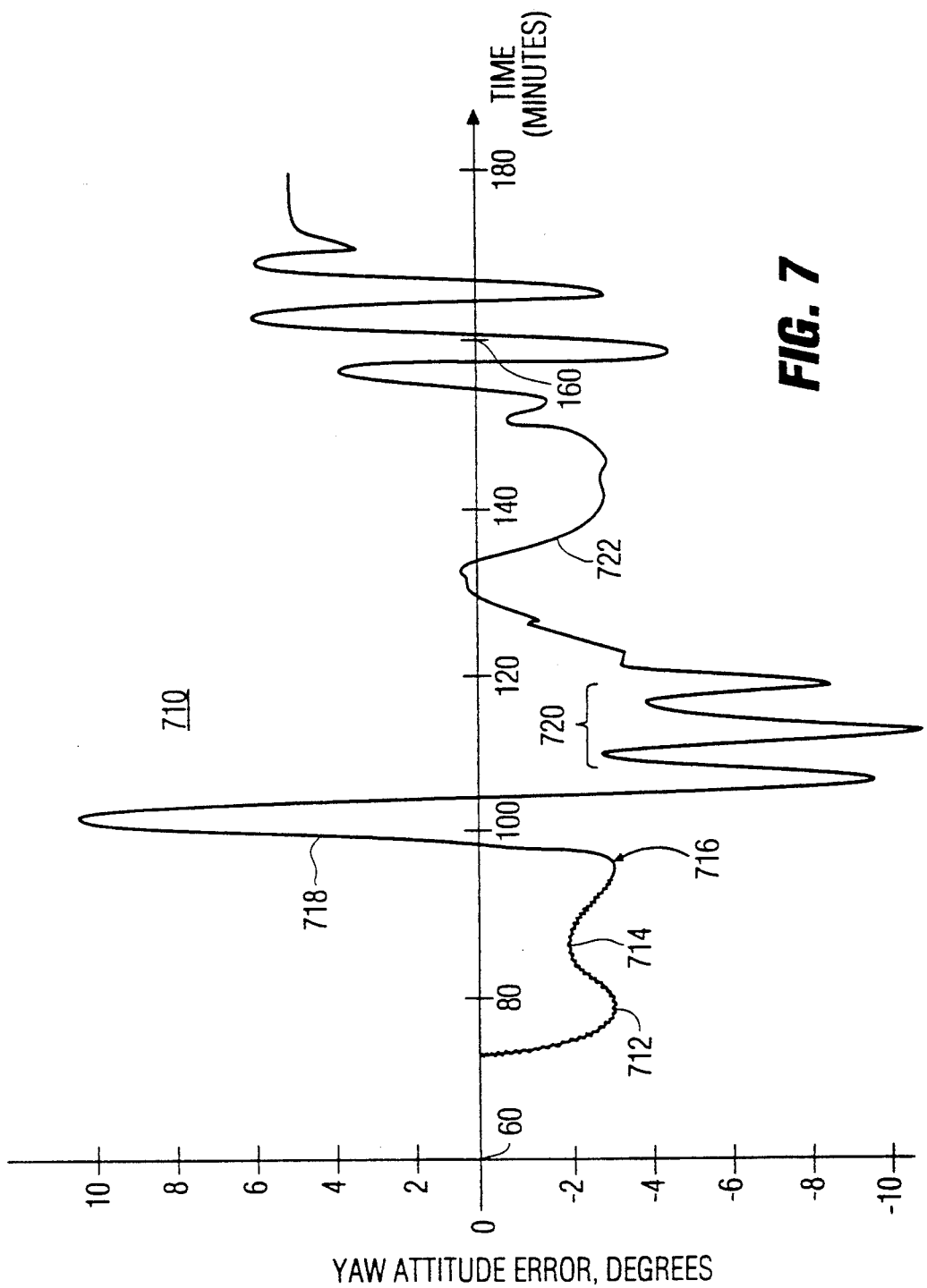
FIG. 7 is a plot of the yaw performance of a satellite using a gyroless yaw control system in accordance with FIG. 7.

An actual embodiment of the invention as so far described in FIG. 6 was implemented on an operating satellite with a 100 minute orbital period, and having identical yaw, roll and pitch reaction wheels, the dynamics of which are defined above, and also having identically tuned yaw, roll and pitch attitude control compensators (330, 332, and 334 of FIG. 3) adjusted to 0.1 rad/sec bandwidth, and in which the the estimator gains were −960.0, 0.609, −0.384, and −0.899 for Ke(1), Ke(2), Ke(3), and Ke(4) respectively. When the gyroscopically actuated yaw control system was disabled, and the above described estimator was given control of the satellite yaw attitude, the yaw attitude error as a function of time was plotted. FIG. 7 is a copy of the telemetered data. In FIG. 7, the plot designated generally as 710 represents degrees of yaw attitude error. In FIG. 7 control was transferred to the inventive yaw estimator at about 72 min along the time scale. Starting from zero error, the system converges and stabilizes the yaw attitude at about 80 minutes (portion 712 of plot 710). Region 714 represents the estimator's control in response to unmodelled environmental disturbance torques. Interruption 716 in plot 710 represents a data drop-out. At about 98 minutes, the estimator was re-started with zero initial conditions as a test. Again, for reasons that are not fully understood, the estimator experiences a brief transient in the opposite direction. Following 110 minutes, the system again stabilizes, but was disturbed in the region 720, by the satellite's automatic magnetic momentum unloading system. Such unloading takes place periodically during normal satellite operation because of the accumulation of disturbance momentum. In the interval between 120 and 150 minutes, the unperturbed estimator yaw control can be seen as a region 722 of plot 710. Following 150 minutes, another automatic magnetic momentum unloading event occurs which obscures the estimator response. It appears from the unperturbed portions of the plot that the yaw error does not exceed about three degrees when operating using estimated yaw control. The constant negative offset of about 1.5 degrees is attributed to an unmodelled constant aerodynamic body fixed yaw torque.

In the estimator design as so far described in conjunction with FIG. 6, the disturbance torques are not modelled. Since a constant yaw disturbance torque results in a fixed roll reaction wheel speed offset (a constant value about which the wheel speed varies symmetrically), and similarly, a constant roll disturbance torque results in a fixed yaw reaction wheel speed offset, the estimator according to the invention, as further illustrated in FIG. 8, additionally calculates the constant yaw and roll axis environmental disturbance torques, $T_{xo}$ and $T_{yo}$ from the averaged yaw and roll axis reaction wheel speeds (or their components) as follows:

$$T_{xo} = \omega_o J_y \bar{S}_y \qquad (2)$$

$$T_{yo} = \omega_o J_x \bar{S}_x \qquad (3)$$

where $\omega_o$ is a scalar representing the satellite's orbit rate (rad/sec); and $J_x$ and $J_y$ are scalars representing the yaw and roll reaction wheel rotary inertias; and $\bar{S}_x$ and $\bar{S}_y$ are the yaw and roll reaction wheel speeds averaged over a period of one orbit or more, as follows:

$$\bar{S}_x = \frac{1}{T} \int_0^T S_x(t)dt \qquad (4)$$

$$\bar{S}_y = \frac{1}{T} \int_0^T S_y(t)dt \qquad (5)$$

where

T is the vehicle orbit period, T seconds (or more).

The constant component Yaw and roll disturbance torque signals, $T_{xo}$ and $T_{yo}$, are then summed with other torque estimates for improved correction.

Figure 8:
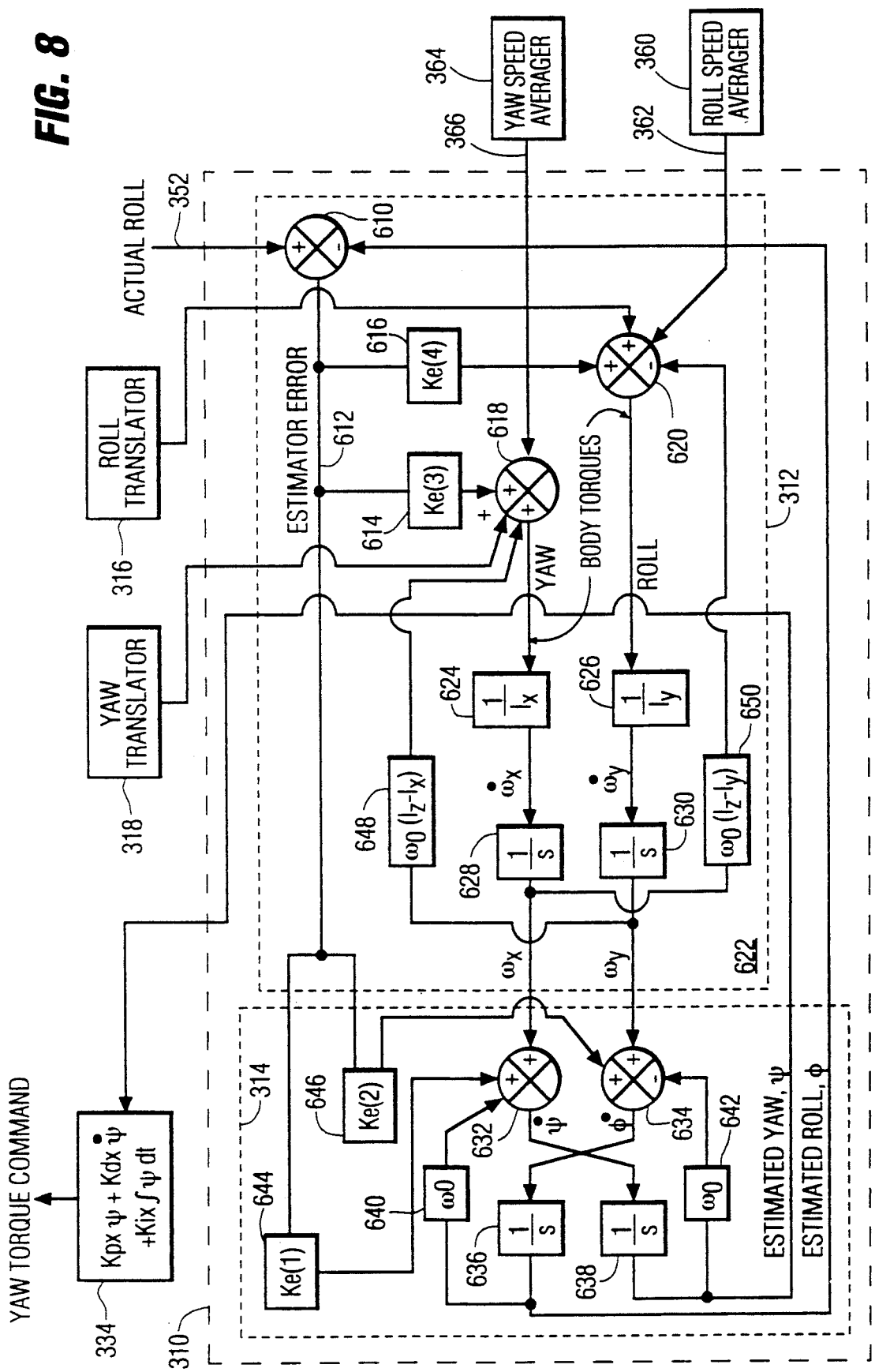
FIG. 8 is a simplified block diagram of roll and yaw rigid body dynamics and orbit kinematics models with disturbance torque compensator.

FIG. 8 is similar to FIG. 6, and corresponding elements are designated by like reference numerals. FIG. 8 differs from FIG. 6 in that the yaw reaction wheel speed averaged signals from block 364 are applied by way of path 366 to a further non-inverting port of summing circuit 618, and similarly, the roll reaction wheel speed averaged signals from block 360 are applied by way of path 362 to a further non-inverting port of summing circuit 620. As mentioned above, the average reaction wheel speed represents the constant component of disturbance torque in the direction of the satellite body axis. Just as control torque signals, such as produced by translators 316 and 318, are required to properly orient the satellite as it orbits the Earth, the disturbance torque signals produced by averagers 360 and 364 are required to compensate for disturbance torques. Since both torques act at the same time, they are simply summed together in summing circuits 618 and 620. The roll/yaw orbit kinematics model and roll-/yaw rigid body dynamics model operate on the combined torques as described in conjunction with FIG. 6.

FIG. 9 illustrates by a plot 910, simulated yaw pointing, for a spacecraft identical to that described in conjunction with FIG. 7. As illustrated, plot 910 has a steady state yaw pointing error of 3°. Plot 912 of FIG. 9 is a simulation of the same spacecraft, with the addition of a disturbance torque estimator as described in FIG. 8. As illustrated in plot 912, the steady state yaw pointing error is 0.68°, constituting a significant improvement.

Other embodiments of the invention will be apparent to those skilled in the art. For example, analog and digitally operated controls may be freely interchanged a conditions require. Also, the estimated yaw rate used in the yaw control compensator 334 of FIG. 6 can be derived by differentiating the estimated yaw as described, or it may instead be taken directly from the output of integrator 628. The estimator gains may be calculated by using a numerical pole-placement algorithm, by using a Linear Quadratic Regulator algorithm, or by any other method.

What is claimed is:

1. An attitude control system for controlling the orientation of a zero momentum satellite relative to a heavenly body, said satellite having gyroscopic freedom in the orbital plane, and deriving orientation references in the absence of operative gyroscopes, comprising:

a satellite body defining roll and yaw axes, said yaw axis being Earth pointing, said roll axis being parallel to the satellite motion, said satellite body having yaw and roll body inertias about said yaw and roll axes respectively;

first and second reaction wheels mounted on said body, each of said first and second reaction wheels having a component of momentum along the satellite roll and yaw axes, respectively;

Earth sensing means mounted on said body for generating signals representing roll attitude of said satellite relative to said heavenly body;

first and second reaction wheel driving means coupled to said first and second reaction wheels, respectively, for accelerating said wheels under the control of torque command signals representing torque commands about said satellite yaw and roll axes;

first and second tachometer means coupled to said first and second reaction wheels, respectively, for generating speed signals representing the angular velocities of said reaction wheels;

roll attitude control means coupled to said Earth sensing means, and to at least one of said first and second reaction wheel driving means for processing said roll attitude error signals with at least proportional and rate compensation of said roll attitude, for generating said torque command signals representing said torque commands about said roll axis, for accelerating at least an associated one of said reaction wheels;

yaw attitude control means coupled to at least one of said first and second reaction wheel driving means for processing estimated yaw signals with at least proportional and rate compensation of said yaw attitude, for generating said torque command signals representing said torque commands about said yaw axis, for accelerating at least an associated one of said reaction wheels;

roll reaction wheel torque translation means coupled to at least one of said first and second tachometer means for differentiating said speed signals to generate roll reaction wheel torque representative signals;

yaw reaction wheel torque translation means coupled to at least one of said first and second tachometer means for differentiating said speed signals to generate yaw reaction wheel torque representative signals;

yaw estimating means coupled to said Earth sensing means, to said roll and yaw reaction wheel torque translation means, and to at least one of said first and second reaction wheel driving means, for modelling the linearized roll/yaw orbit kinematics of said satellite, and for additionally modelling the roll/yaw rigid body dynamics of said satellite, and for applying said signals representing roll attitude, and said yaw and roll reaction wheel torque representative signals to said model, for generating and applying signals representing torque commands about said satellite yaw axis, to said at least one of said first and second reaction wheel driving means;

disturbance torque estimating means, said disturbance torque estimating means comprising:

(a) average speed measuring means coupled to at least one of said first and second tachometer means for producing average speed signals representative of the average speed of said one of said reaction wheels; and (b) scaling means coupled to said average speed measuring means, for scaling said average speed signals by a factor representative of reaction wheel gyroscopic momentum to produce disturbance torque representative signals representing the constant component of the disturbance torque; and summing means coupled to said disturbance torque estimating means and to said yaw estimating means for adding said disturbance torque representative signals to one of said yaw and roll reaction wheel torque representative signals.

2. A system according to claim 1 wherein said reaction wheel axes are non-orthogonal, and further comprising:

a momentum-axis transformation means coupled to said tachometer means and to said wheel drive means for transforming coordinates between said non-orthogonal axes to orthogonal axes.

3. A system according to claim 1 wherein said first reaction wheel is a yaw reaction wheel, and said one of said first and second reaction wheels to which said yaw estimating means is coupled is said yaw reaction wheel.

4. A system according to claim 1 wherein said satellite further defines a pitch inertia about a pitch axis, and said yaw estimating means includes roll/yaw rigid body dynamic modelling means comprising:

yaw and roll estimating means for generating an estimated yaw and roll signals in response to estimated roll and yaw body rate signals and scaled estimated roll error signals;

first differencing means coupled to said Earth sensing means, and to said yaw and roll estimating means for generating said estimated roll error signals, representative of the difference between said roll representative signal and estimated roll signals;

first and second scaling means coupled to said first differencing means for multiplying said estimated roll error signals by first and second scalar quantities, respectively, to produce first and second scaled estimated roll error signals.

first summing means coupled to said first scaling means and to said yaw reaction wheel torque translation means for summing said yaw reaction wheel torque representative signals, said scaled estimated roll error signals, and an estimated yaw gyroscopic torque signal, for generating estimated yaw torque signals;

second summing means coupled to said second scaling means, and to said roll reaction wheel torque translation means, for summing said roll reaction wheel torque representative signals, said scaled estimated roll error signals, and an estimated roll gyroscopic torque signal, for generating estimated roll torque signals;

yaw body rate estimating means coupled to said first summing means, for generating estimated yaw body rate by integrating the quotient of said estimated yaw torque signals divided by said satellite yaw inertia;

roll body rate estimating means coupled to said second summing means, for generating estimated roll body rate by integrating the quotient of said estimated roll torque signals divided by said satellite roll inertia;

yaw-roll cross-coupling torque estimating means coupled to said roll body rate estimating means and to said first summing means, for multiplying, by the orbital rate, the difference between said pitch and roll body inertias, to produce estimated yaw gyroscopic torque signals, and for coupling said estimated yaw gyroscopic torque signals to said first summing means;

roll-yaw cross-coupling torque estimating means coupled to said yaw body rate estimating means and to said second summing means, for multiplying, by the orbital rate, the difference between said pitch and yaw body inertias, to produce estimated roll gyroscopic torque signals, and for coupling said estimated roll gyroscopic torque signals to said second summing means.

5. A system according to claim 4 wherein said yaw estimating means includes roll/yaw orbit kinematics modelling means comprising:

third and fourth scaling means coupled to first differencing means for producing third and fourth scaled estimated roll error signals;

third summing means coupled to said roll/yaw rigid body dynamic modelling means and to said third scaling means for summing together said estimated yaw signals, said third scaled estimated roll error signals, and a yaw attitude kinematic correction signal to produce estimated yaw attitude rate signals;

fourth summing means coupled to said roll/yaw rigid body dynamic modelling means and to said fourth scaling means for summing together said estimated roll signals, said fourth scaled estimated roll error signals, and a roll attitude kinematic correction signal to produce estimated roll attitude rate signals;

third integration means coupled to said fourth summing means, and to said first differencing means, for integrating said estimated roll attitude rate signals, to produce said estimated roll attitude signals;

fourth integration means coupled to said third summing means, and to said first differencing means, and to said yaw attitude control means for integrating said estimated yaw attitude rate signals, to produce said estimated yaw attitude signals;

roll and yaw orbital rate scaling means coupled to said third and fourth integrating means, respectively, and to said third and fourth summing means, respectively, for multiplying said estimated roll and yaw respectively by signals representative of said orbit rate for producing said yaw and roll attitude kinematic correction signals, respectively.

6. A system according to claim 5 wherein said average speed measuring means comprises:

integrating means coupled to at least one of said first and second wheel tachometer means, for accumulating signals representative of wheel speed for a period of time to produce an accumulated signal;

dividing means coupled to said integrating means for dividing said accumulated signal by the said time of accumulation.

7. A method for controlling the orientation of a zero momentum satellite relative to a heavenly body, said satellite having gyroscopic freedom in the orbital plane, and deriving orientation references in the absence of operative gyroscopes, the satellite body defining roll and yaw axes, said yaw axis being Earth pointing, said roll axis being parallel to the satellite motion, said satellite body having yaw and roll body inertias about said yaw and roll axes respectively, said method comprising the steps of:

spinning first and second reaction wheels mounted on said body, to produce components of momentum along said satellite roll and yaw axes, respectively;

generating signals representing roll attitude of said satellite relative to said heavenly body;

generating torque command signals representing said roll attitude about said roll axis;

applying said torque command signals to said at least one of said first and second reaction wheels;

generating roll reaction wheel speed signals representing the effective angular velocities of said reaction wheel;

generating yaw reaction speed signals representing the effective angular velocities of said reaction wheel;

differentiating said reaction wheel speed signals to generate roll reaction wheel torque representative signals;

differentiating said yaw reaction wheel speed signals to generate yaw reaction wheel torque representative signals;

modelling the linearized roll/yaw orbit kinematics of said satellite for producing a roll/yaw orbit kinematics model;

modelling the roll/yaw rigid body dynamics of said satellite for producing a roll/yaw rigid body dynamics model;

applying said signals representing roll attitude error, and said yaw and roll reaction wheel torque representative signals to said roll/yaw rigid body dynamics model for producing estimated roll and yaw body rate signals;

applying said roll and yaw body rate signals, and said roll error signals to said to roll/yaw orbit kinematics model for generating estimated yaw and roll attitude error signals;

generating yaw torque command signals representing said estimated yaw error about said yaw axis;

applying said yaw torque command signals to at least an associated one of said reaction wheels, for accelerating said wheel, for generating yaw torque;

averaging the speed of one of at least one of said yaw and roll reaction wheel speed signals to produce average wheel speed signals;

scaling said average wheel speed signals by the product of reaction wheel polar inertia multiplied by orbit rate for producing disturbance torque signals representative of the constant component of environmental disturbance torques; and summing said disturbance torque signals with one of said reaction wheel torque representative signals for correcting for the constant component of environmental disturbance torques.

8. A system according to claim 1 wherein said satellite further defines a pitch inertia about a pitch axis, and wherein said step of modelling said roll/yaw rigid body dynamics of said satellite comprises the further steps of taking the difference between said roll representative signal and estimated roll signals to produce signals representing estimated roll error;

multiplying said estimated roll error signals by first and second scalar quantities, respectively, to produce first and second scaled estimated roll error signals.

summing said yaw reaction wheel torque representative signals, said scaled estimated roll error signals, and an estimated yaw gyroscopic torque signal, for generating estimated yaw torque signals;

summing said roll reaction wheel torque representative signals, said scaled estimated roll error signals, and an estimated roll gyroscopic torque signal, for generating estimated roll torque signals;

generating estimated yaw body rate by integrating the quotient of said estimated yaw torque signals divided by said satellite yaw inertia;

generating estimated roll body rate by integrating the quotient of said estimated roll torque signals divided by said satellite roll inertia;

multiplying said estimated roll body rate, by the product of orbit rate and the difference between said pitch and roll body inertias, to produce estimated yaw gyroscopic torque signals;

coupling said estimated yaw gyroscopic torque signals to said first summing means;

multiplying said estimated yaw body rate, by the product of orbit rate and the difference between said pitch and yaw body inertias, to produce estimated roll gyroscopic torque signals;

coupling said estimated roll gyroscopic torque signals to said second summing means.

9. A method according to claim 8 wherein said step of modelling said roll/yaw rigid body dynamics of said satellite comprises the further steps of scaling said estimated roll error signals to produce third and fourth scaled estimated roll error signals;

summing together said estimated yaw signals, said third scaled estimated roll error signals, and a yaw attitude kinematic correction signal to produce estimated yaw attitude rate signals;

summing together said estimated roll signals, said fourth scaled estimated roll error signals, and a roll attitude kinematic correction signal to produce estimated roll attitude rate signals;

integrating said estimated roll attitude rate signals, to produce said estimated roll attitude signals;

integrating said estimated yaw attitude rate signals, to produce said estimated yaw attitude signals;

multiplying said estimated roll and yaw signals, respectively, by signals representative of said orbit rate for producing said yaw and roll attitude kinematic correction signals, respectively.

* * * * *